United States Patent
Aurora et al.

(10) Patent No.: US 7,472,101 B2
(45) Date of Patent: Dec. 30, 2008

(54) INFERENTIAL STATE MACHINES

(75) Inventors: Puneet Aurora, Mountion View, CA (US); Suresh Subramani, San Jose, CA (US); Nick Che Ken Leong, Millbrae, CA (US)

(73) Assignee: TIBCO Software Inc., Palo Alto, CA (US)

( * ) Notice: Subject to any disclaimer, the term of this patent is extended or adjusted under 35 U.S.C. 154(b) by 202 days.

(21) Appl. No.: 11/180,075

(22) Filed: Jul. 12, 2005

(65) Prior Publication Data

US 2007/0094192 A1    Apr. 26, 2007

(51) Int. Cl.
*G06N 5/00*     (2006.01)

(52) U.S. Cl. .............................. 706/46; 706/45; 706/2; 706/50

(58) Field of Classification Search .................... 706/2, 706/45, 46, 50
See application file for complete search history.

(56) References Cited

U.S. PATENT DOCUMENTS

| | | | | |
|---|---|---|---|---|
| 5,481,648 | A | * | 1/1996 | Volponi et al. ................ 706/45 |
| 5,606,646 | A | * | 2/1997 | Khan et al. .................... 706/2 |
| 5,903,886 | A | * | 5/1999 | Heimlich et al. .............. 706/50 |

OTHER PUBLICATIONS

Hadjicostis, Christoforos, N., Finite-State Machine Embeddings for Non-Concurrent Error Detection and Identification, Proceedings of the 42nd IEEE COnference on Decision and Control, Dec. 2003, pp. 1-6.

Hadjicostis, Christoforos, N., Encoded Finite-State Machines for Non-Concurrent Error Detection and Identification, 2003, pp. 1-4.
Drineas, Petros and Makris, Yiorgos, SPaRe: Selective Partial Replication for Concurrent Fault Detection in FSMs, Proceedings of the 16th International Conference on VLSO Design, 2003. pp. 1-7.
Zulkernin, Mohammad and Seviora, Rudolph, E., Springer-Verlag Berlin Heidelberg, 2002, pp. 1-20.
Hadjicostis, Christoforos, N., Nonconcurrent Error Detection and Correction in Fault-Tolerant Linear Finite-State Machines, IEEE Transactions on Automatic Control, vol. 48, No. 12, Dec. 2002, pp. 1-8.
Drineas, Petros and Makris, Yiorgos, SPaRe: Selective Partial Replication for Concurrent Fault-Detection in FSMs, IEEE Transactions of Instrumentation and Measurement, vol. 52, No. 6, Dec. 2003, pp. 1-12.
Abdulla, Parosh Aziz and Rabinovich, Alexander, Verification of Probabilistic Systems with Faulty Communication, Springer-Verlag Berlin Heidelberg, 2003, pp. 1-15.
Jiang, Guofei and Cybenko, George, Temporal and Spatial Distributed Event Correlation for Network Security, Proceedings of the IEEE, 2004 IEEE American Control Conference, Boston, MA, Jun. 30-Jul. 2, 2004, pp. 1-6.
PCT/US05/26755, Search Report and Written Opinion of International Searching Authority mailed Jun. 30, 2008.*

* cited by examiner

*Primary Examiner*—Wilbert L Starks, Jr.
(74) *Attorney, Agent, or Firm*—Baker & McKenzie LLP

(57) ABSTRACT

An extended state machine that makes use of an inference engine as the infrastructure for adding inferential capabilities to the state machine's execution. The result is a state machine that may operate on partial or disordered information, inferring intermediate states that have yet to be formally traversed. In addition, controls such as state timeouts and transition priorities allow for finer control of the state machine's execution, particularly in unexpected circumstances.

18 Claims, 2 Drawing Sheets

INFERENTIAL STATE MACHINES

FIELD OF THE INVENTION

The present invention relates to a state machine that may operate on partial or disordered information, inferring intermediate states that have yet to be formally traversed.

BACKGROUND

The behavior of many common items and situations can be modeled using a simple but powerful tool called a finite state machine (FSM). Examples of functions that have been efficiently translated into state machines include vector control for signal processing algorithms, data encoding and decoding, encryption and decryption, event monitoring, and simple machine control functions. An FSM is usually represented in the form of a directed graph that includes states interconnected by transitions. Many computer tools exist that enable designers to "draw" a representation of the system being modeled by defining states of a state machine and connecting those states together with directional lines that represent state transitions. Such a model is generally independent of the system being modeled and can be created before or after the physical system is developed.

An FSM is, generally, a digital (or sometimes mechanical) device that traverses through a sequence of states in an orderly fashion, with the transition from one state to another representing the consumption of one or more inputs or occurrence of other events. In some cases, state transitions are augmented with various activities. The FSM may be embodied as a set of computer-readable instructions that a computer processor can read and follow, and/or a collection of logic gates for implementing particular operations.

A state machine will typically include two distinct functional blocks: a next state decoder and an output decoder. The next state decoder determines the next state of the state machine (i.e., based on the current state and a set of inputs) while the output decoder generates the actual outputs. It is the next state decoder that is responsible for ensuring that the state machine traverses an order of states, as directed by the inputs; while the output decoder provides sequences of output signals based upon the state transitions. At times, these outputs may be returned as inputs to the FSM, e.g., via one or more feedback signals.

The distinguishing characteristic of a state machine then is its process-oriented nature. The state machine moves over time from state to state, or put differently, from milestone to milestone, to an ultimate goal or final state. State machines are typically lossless in their processing. That is, they consume their input in order and without any losses. This assumption is reasonable in many domains, but not all. In particular, when a state machine's input is a series of data items provided by multiple systems in a distributed architecture, ordering may be subverted, and data may be lost. In such situations conventional state machines either stall or make incorrect state transitions; each outcome being unacceptable. Accordingly, what is needed is a state machine capable of coping with situations in which input data may arrive out of sequence or not at all without experiencing such errors.

SUMMARY OF THE INVENTION

The present invention provides, in one embodiment, a processing system that includes a state machine, defined by a plurality of states and event-dependent transitions there between, and an inference engine configured to permit inference of the likely completion of one or more missed event inputs to the state machine from observations of successful completions of one or more other events out-of-order. The inference engine thus allows the state machine to proceed from its current state to a new state associated with the completion of the out-of-order event(s), even in the absence of missed event inputs. Where those missed inputs are later received, the inference engine may be configured to validate its inferences (i.e., its computed state transitions) in accordance therewith.

The state machine may include timeout means associated with one or more of its states, which timeout means can cause the state machine to transition to designated states upon expiration of a timeframe defining the timeout prior to receipt of a specified event input. The state machine may also be configured with at least one transition function defined by one or more event conditions, rather than an explicit event occurrence. Such event conditions may have prioritized transition functions and the state machine may be configured to transition from a current state to one or more subsequent states according to the transfer function having a highest priority (e.g., in cases where more than one event conditions is true at a time when a state transition is to occur).

BRIEF DESCRIPTION OF THE DRAWINGS

The present invention is illustrated by way of example, and not limitation, in the figures of the accompanying drawings in which.

DETAILED DESCRIPTION

Figure 1:
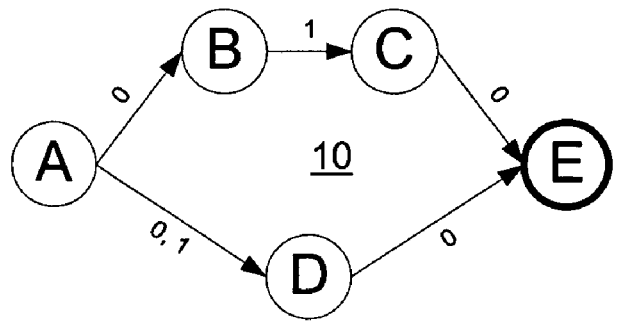
FIG. 1 illustrates an example of a conventional finite state machine.

Described herein is an extended state machine that makes use of an inference engine as the infrastructure for adding inferential capabilities to the state machine's execution. The result is a state machine that may operate on partial or disordered information, inferring intermediate states that have yet to be formally traversed. In addition, controls such as state timeouts and transition priorities allow for finer control of the state machine's execution, particularly in unexpected circumstances.

Although the present invention will be discussed with reference to various examples and embodiments thereof, it should be remembered that these examples are not meant to limit the scope of the invention as defined by the claims accompanying this description. Moreover, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., xmi, HTML, SGML, XML, VoXML), and the like, as well as object-oriented environments such as the Common Object Request Broker Architecture (CORBA), Java™ and the like. In general, however, all of the aforementioned terms as used herein are meant to encompass any series of logical steps performed in a sequence to accomplish a given purpose and, in the case of a state machine, maintain state information regarding a modeled system (e.g., through the maintenance of state tables and the like).

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Moreover, the computer-readable instructions may be stored at a server configured to provide the instructions to a client in response to a request therefore. Such a request may come via any conventional communication path, for example, an ftp, http or https request (or other file transfer request) via one or more networks or networks of networks (e.g., a local area network, wide area network or the Internet).

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

As indicated above, finite-state machines are often used as ways to model the processing of data. That is, real-world (i.e., physical) systems (which are often complex and can involve a number of subsystems) may be abstracted and represented in a virtual sense by a state machine. Such models are useful where, for example, one wishes to determine potential outcomes in the physical system for a given set of inputs. While it would be impractical (indeed, sometimes impossible) to make such determinations using the physical system itself, often the virtual representation of that system (i.e., the state machine) can be used for such purposes. Alternatively, or in addition, state machines may be used to track processing within the physical system. Such "track and trace" implementations are especially useful where the physical system is widely distributed over a number of subsystems and/or where other forms of transaction monitoring are impractical or difficult to implement. State machines may also be used as models for tracking states of a computer-based system, such as a complex software-driven system.

A more formal definition of a non-deterministic finite state machine may be given by a 5-tuple (S, $\Sigma$, T, s, F), where:
is a finite set of states;
$\Sigma$ is a finite input alphabet;
T is a transition function mapping state/alphabet pairs to sets of states:
S=($\Sigma \cup \{\epsilon\}$) to $2^S$, where $2^S$ represents the power set of S;
s is an element of S, designated as the start state; and
F is a subset of S, designated as the final states.

Given an input string $x_1, x_2, x_3, \ldots, x_n$, comprised of elements of $\Sigma \cup \{\epsilon\}$, one says that a non-deterministic finite state machine accepts the string if the state machine can run through a series of states $s_0, s_1, s_2, \ldots, s_n$ such that,
$s_0 = s$;
$s_{i+1}$ is a member of $T(s_i, x_i)$, for i=0, 1, \ldots, n-1; and
$s_n$ is an element of F.

Thus, the state machine is started in its start state, and a transition is made for each element of the input string. The string is considered accepted if and only if the state machine is left in a final state after all elements of the input string have been processed.

For example, consider the state machine 10 illustrated in FIG. 1, where:
S={A, B, C, D, E};
$\Sigma$={0, 1};
T is represented as: T(A, 0)={B, D},
T(A, 1)={D},
T(B, 1)={C},
T(C, 0)={E},
T(D, 0)={E};

s=A; and

F={E}.

As shown, this state machine 10 can be represented pictorially as a directed graph, with the nodes of the graph representing the allowable states (A, B, C, D and E) and the labeled arcs of the graph representing the transitions between those states. In this case, the labels on the arcs represent the alphabet elements that are mapped in the transitions. Thus, state "A" is the initial state, state "E" is the final state, and the accepted input strings are "010", "00", and "10". In addition to making transitions from state A to state E, which transitions represent consumption of inputs at the intermediate states, some or all of the transitions may be accompanied by activities that are executed. Thus the consumption of an input not only guides a determination of acceptance of the input, but may also drive activities or outputs as well.

Conventional state machines are limited in that they are typically lossless in their processing—that is, conventional state machines consume their input in order and without any losses. Such a model is reasonable in many domains, but not all. In particular, when a state machine's input is a series of data items provided by multiple systems or sub-systems in a distributed architecture, ordering may be subverted, and data may be lost. In such conditions, conventional state machines often stall or otherwise malfunction.

In contrast, the present invention provides an extension to traditional finite state machines that allows state machines to cope with disordered or lost data. In one embodiment, an inference engine is used to predict the path a state machine would have taken had one or more inputs not been corrupted. This inference mechanism allows the state machine to continue computing in situations where a traditional state machine would either stall, or make incorrect transitions.

Although the remaining discussion focuses on non-deterministic state machines, it applies equally to deterministic state machines. Deterministic state machines (that is state machines that do not accept the null input character, $\epsilon$, and for which the transition function maps state/input pairs to a single state rather than to a set of states) are a subset of their non-deterministic counterparts. Further, every non-deterministic state machine can be transformed into a deterministic state machine.

Figure 2:
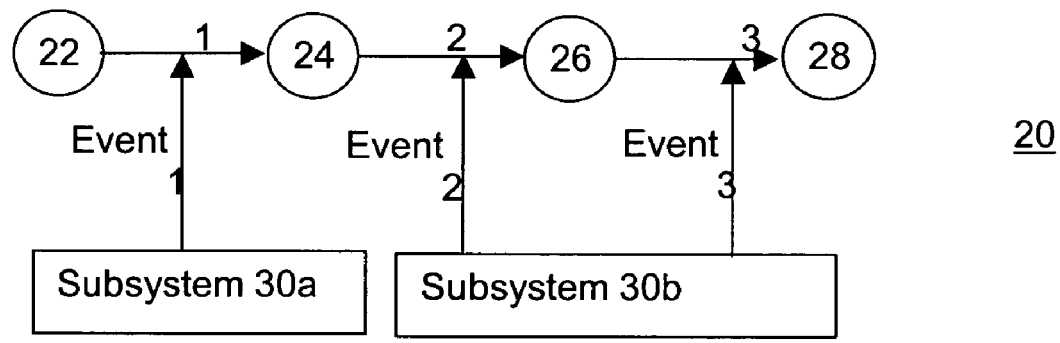
FIG. 2 illustrates an example of a state machine used to track and trace the activities of multiple subsystems.

To better understand the present invention, consider a track and trace implementation in which a state machine is used to monitor a business process flow (e.g., insurance claim handling, mobile phone transaction request and satisfaction, content submission and publication, etc.) involving multiple, distributed systems and/or subsystems. The job of the state machine is to track and trace the business system's overall progress. Each individual system/subsystem that makes up the overall business system may generate one or more outputs that signal intermediate task completions, and the processing of these outputs by the state machine allows for tracking the progress of the overall system. FIG. 2 illustrates a basic example of this concept in which a state machine 20 is utilized for tracking and tracing two subsystems 30a and 30b.

The start state, 22, represents that neither of the subsystems 30a or 30b has yet signaled the completion of an event. State 24 represents subsystem 30a having sent Event 1. State 26 represents subsystem 30a having sent Event 1 and subsystem 30b having sent Event 2. State 28 (the final state) represents subsystem 30a having sent Event 1, subsystem 30b having sent Event 2, and subsystem 30b having sent Event 3.

In addition to tracking state transitions based on input events, state machine 20 may be augmented to perform actions upon any particular transition. For example, the transition function between states 24 and 26 may, in addition to mapping the state transition upon the occurrence of Event 2, invoke an action (such as generating an output). Actions might include storing data in a database, signaling an event to another state machine, and so on.

So long as state machine 20 consumes its input in order, waiting at intermediate states 24 and 26 until additional input elements (Events 2 and 3 in this example) are available for processing, the monitoring of activities with subsystems 30a and 30b can proceed. However in distributed systems such as this, where the inputs to a state machine may be generated dynamically by a number of separate subsystems, there is the possibility that some inputs to the state machine may be delayed or lost entirely. Consider, for example, the situation reflected in FIG. 3, where the loss of the Event 2 output of subsystem 30b has occurred.

The loss of an input such as Event 2 may well cause a conventional state machine to stall in state 24, unable to move forward and unable to successfully track any further progress of the distributed system. If such a loss were due to a communication failure (e.g., a network outage or other event), rather than a failure of the actual subsystem being monitored, the operator of the system may end up spending needless sums on investigating a fault that does not actually exist. Moreover, additional transactions that are processed by the physical system might go unrecorded, resulting in lost revenue opportunities or other business.

Figure 3:
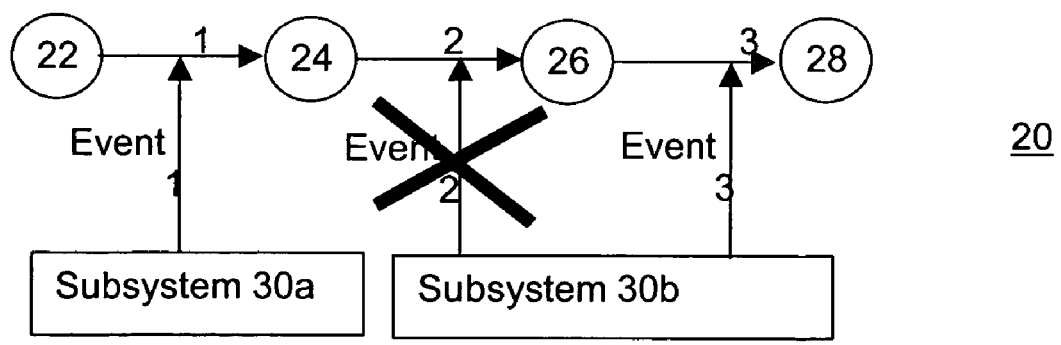
FIG. 3 illustrates an example of a missed input from one of the subsystems being monitored with the state machine illustrated in FIG. 2.

The reason conventional state machines stall in situations such as that depicted in FIG. 3 is because such state machines are typically implemented in computer readable instructions (i.e., software) to operate in the static manner of their formal definition. In contrast, state machines configured in accordance with embodiments of the present invention are implemented within the context of an inference engine. An inference engine is a computer-implemented process that can verify or generate an "inference step", i.e., an expression of an inference from one or more premises. By this we mean the kind of data typically intended to express a logical inference from one or more premises to a conclusion. By grounding a state machine in the context of the inference engine, the present invention allows for inferred transitions between states. Other operational extensions to conventional state machines provided by the present invention include machine timeouts and prioritized transitions. Each of these defines an extension to formal state machines that allows such devices to cope with the sort of exceptional circumstances presented in distributed systems.

Inferred Transitions: The implementation of a state machine within an inference engine provides an opportunity to continue making state transitions in the presence of input disorder or loss. In particular, inferences can be made about possible (or certain) future states without having to perform intermediate transitions. For example, consider again the state machine illustrated in FIG. 3. If one assumes that Event 2 and Event 3 are sequential (that is, that Event 3 cannot occur until after Event 2 has occurred), then one can infer from the presence of Event 3 that Event 2 was lost, and that the state machine 20 could progress to State 28.

The present state machine does this by means for making inferences in situations in which data may be disordered or lost. In particular, the inference engine-based state machine is configured to keep track of a set of possible intermediate states that reflect input that may have arrived out of order, or may have arrived after other input was lost. The inference engine is configured to iteratively produce a new set of possible intermediate states from the current set, based on additional input. In other cases, the inferences may be arrived at according to user-defined criteria that define one or more paths. Moreover, in some embodiments of the invention the occurrence of future states may be inferred from the occurrence of present states and vice-versa.

In addition to inferring progress in situations with disordered or lost input, the present state machine can validate its inferences should data arrive out-of-order. For example, in the state machine illustrated in FIG. 3, input that arrives as {1, 3, 2} can be handled by inferring the transition to state 28 (from state 24), and then subsequently validating the transition from state 24 to 26 upon arrival of the out-of-order Event 2.

Figure 4:
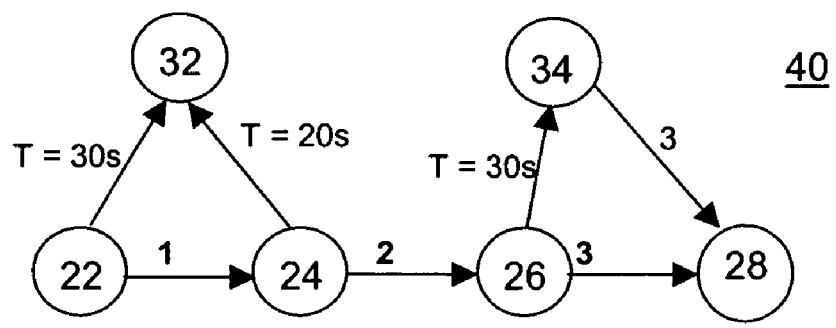
FIG. 4 illustrates an example of a state machine configured with timeout processing in accordance with an embodiment of the present invention.

State Timeouts: A second mechanism for coping with exceptional conditions such as disordered or lost input is a timeout mechanism. In this case the state machine may include timeouts associated with any particular state such that a lack of input within that timeframe will cause a specified transition (e.g., to an error state). For example, consider the state machine 40 illustrated in FIG. 4.

Subsystems 30a and 30b are not shown in this illustration, however, the state transitions 1, 2 and 3 are illustrated between states 22 and 24, 24 and 26, and 26 and 26, respectively, as before. State machine 40 has been augmented with additional states, 32 and 34, and transitions from states 22, 24, and 26 that are timeout dependent, rather than input dependent. In executing this state machine, an input that stalls at state 22 for more than 30 seconds will cause a transition to state 32 to occur. Likewise, an input that stalls at state 24 for more than 20 seconds will cause a transition to state 32 to occur. Similarly, an input that stalls in state 26 for more than 30 seconds will cause a transition to state 34 to occur, and a subsequent input of "3," would cause a transition to the final state, 28. Thus in the latter case it is shown that error transitions need not be final, but may be used as an exception handling mechanism for delayed input. In general the present invention contemplates and provides the use of state machines having many different timeout actions, including transitions without reading input, transitions to an explicit state, or transitions to "all states".

Figure 5:
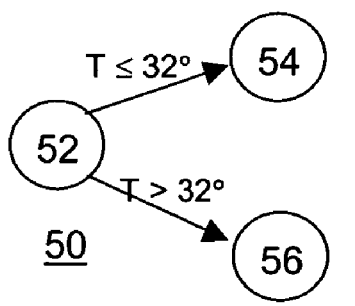
FIG. 5 illustrates an example of a state machine configured with transition functions to accept conditions, rather than explicit characters, as inputs that motivate a state change in accordance with an embodiment of the present invention.

Prioritized Transitions: A further embodiment of the present invention allows a state machine's transition function to accept conditions, rather than explicit characters, as the input that motivates a state change. For example, consider the state machine 50 shown in FIG. 5. In this case, the condition of a sensed temperature (i.e., T less than or equal to 32°, or T greater than 32°) will cause the state machine 50 to make a transition from the initial state 52, to the appropriate follow-on state 54 or 56.

Figure 6:
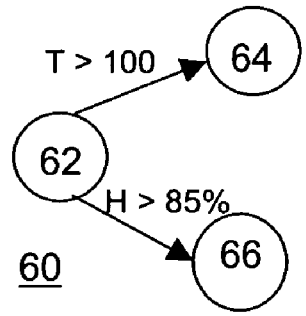
FIG. 6 illustrates an example of a state machine having non-deterministic state transition functions allowing for the use of prioritized state transitions in accordance with an embodiment of the present invention.

As shown in FIG. 6, the present invention can also provide a non-deterministic state machine for which a particular transition is unclear. For example, in state machine 60 both conditions may be true simultaneously. That is, the transition condition from initial state 62 to state 64 (T greater than 100°) may be true at the same time that the transition condition from initial state 62 to state 66 (humidity (H) greater than 85%) is also true. To handle such situations, the present invention allows the transition function to be further augmented with discrete priorities, such that any situation in which two or more conditions are simultaneously true can be deterministically resolved. In the present example, the transition from state 62 to 64 could be given the higher priority, while the transition from state 62 to state 66 could be given the lower priority. Should the state machine 60 arrive at state 62 with both conditions true, it would transition to state 62 based on the higher priority.

Thus the present invention provides a processing system that includes a state machine, defined by a plurality of states and event-dependent transitions there between, and an inference engine configured to permit inference of the likely completion of one or more missed event inputs to the state machine from observations of successful completions of one or more other events out-of-order. The inference engine thus allows the state machine to proceed from its current state to a new state associated with the completion of the out-of-order event(s), even in the absence of missed event inputs. Where those missed inputs are later received, the inference engine may be configured to validate its inferences (i.e., its computed state transitions) in accordance therewith.

Figure 7:
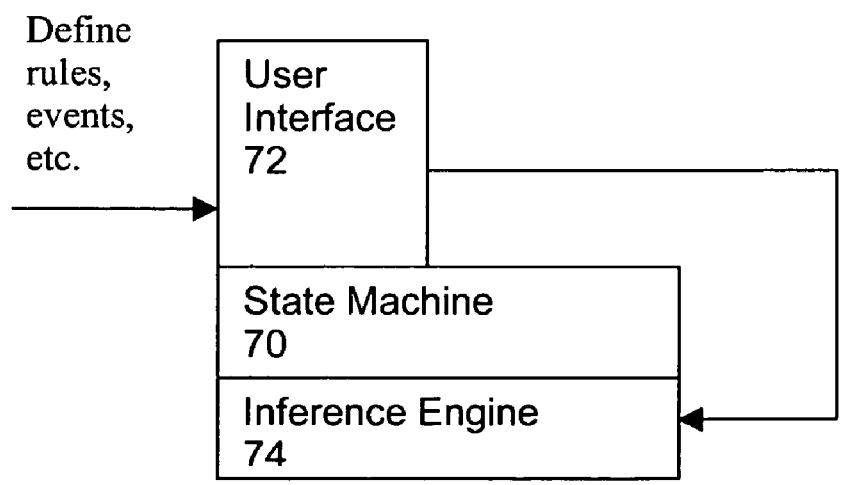
FIG. 7 illustrates and example of a software architecture for a processing system in which a state machine is grounded in an implementation of an inference engine in accordance with an embodiment of the present invention.

Referring to FIG. 7, which illustrates a partial software architecture for a processing system configured in accordance with the present invention, the inference engine 70 and state machine 72 may be defined through a user interface 74 (e.g., a graphical user interface) that permits a system designed to specify the various states, transition events, inference rules, etc. The state machine 72 may include timeout means associated with one or more of its states, which timeout means can cause the state machine to transition designated states upon expiration of a timeframe defining the timeout prior to receipt of a specified event input. The state machine 72 may also be configured with at least one transition function defined by one or more event conditions, rather than an explicit event occurrence. Such event conditions may have prioritized transition functions and the state machine may be configured to transition from a current state to one or more subsequent states according to the transfer function having a highest priority (e.g., in cases where more than one event conditions is true at a time when a state transition is to occur).

Thus, an extended state machine that makes use of an inference engine as the infrastructure for adding inferential capabilities to the state machine's execution has been described. Although discussed with reference to certain illustrated examples, however, the scope of this invention should only be measured in terms of the following claims.

What is claimed is:

1. A processing system for providing logic states, comprising:
one or more subsystems for providing input data derived from corresponding one or more external components;
a computer in communication with the one or more subsystems and configured to provide ordered initial, intermediate, and later logic states based on corresponding initial, intermediate, and later input data to be received in order from the subsystems; and
an inference engine in communication with the computer and configured to cause the computer to directly transition from providing the initial logic state to providing the later logic state in the absence of the intermediate input datum being received by the computer.

2. A processing system according to claim 1, wherein the inference engine is further configured to validate its inference upon later receipt of the intermediate input datum.

3. A processing system according to claim 1, wherein the computer is further configured with at least one timeout means associated with its intermediate logic state, the timeout means configured to cause the computer to directly transition from providing the initial logic state to providing the later logic state upon expiration of a timeframe defining the timeout means and in the absence of the intermediate input datum being received by the computer.

4. A processing system according to claim 1, wherein the computer is further configured to provide one or more of the initial, intermediate, and later logic states based on one or more conditions.

5. A processing system according to claim 4, wherein the conditions comprise event occurrences.

6. A processing system according to claim 4, wherein a plurality of conditions exist, and the plurality of conditions are prioritized in order to determine the logic state provided by the computer.

7. A processing system according to claim 1, wherein the inference engine causes the computer to directly transition from providing the initial logic state to providing the later logic state using an iterative process based on the inference engine monitoring the received initial input data and the received later input data.

8. A processing system according to claim 1, wherein the inference engine is configured to cause the direct transition of the computer from providing the initial logic state to providing the later logic state in response to a query by a client machine in communication with the processing system.

9. A processing system according to claim 8, wherein the inference engine is configured to cause the direct transition of the computer using computer-readable instructions provided to the client machine in response to the query.

10. A method of providing logic states, the method comprising:
    providing one or more external components configured to orderly generate initial, intermediate, and later input data corresponding to ordered first, second and third logic states of a computer;
    receiving the initial input data by the computer;
    providing a first logic state with the computer based on the received initial input data;
    receiving the later input data by the computer;
    inferring the third logic state from an out-of-order receipt of the later input data following the receipt of the initial input data by the computer, and in the absence of the intermediate input datum being received by the computer; and
    providing the third logic state with the computer by directly transitioning from the first logic state to the third logic state based on the inference.

11. A method according to claim 10, further comprising validating the inference upon later receipt of the intermediate input datum by the computer.

12. A method according to claim 10, wherein providing the third logic state further comprises providing the third logic state by directly transitioning from the first logic state to the third logic state based on the inference, and further based on at least one timeout means associated with the computer's second logic state, the timeout means configured to cause the computer to directly transition from providing the initial logic state to providing the later logic state upon expiration of a timeframe defining the timeout means and in the absence of the intermediate input datum being received by the computer.

13. A method according to claim 10, the method further comprising providing one or more of the first, second or third logic states based on one or more conditions.

14. A method according to claim 13, wherein the conditions comprise event occurrences.

15. A method according to claim 13, wherein a plurality of conditions exist, and the method further comprises prioritizing the plurality of conditions to determine which of the one or more first, second or third logic states is provided.

16. A method according to claim 10, wherein providing the third logic state by directly transitioning from the first logic state to the third logic state based on the inference comprises employing an iterative process based on monitoring the received initial input data and the received later input data.

17. A method according to claim 10, wherein inferring the third logic state and providing the third logic state occurs in response to a query by a client machine.

18. A method according to claim 17, wherein inferring the third logic state and providing the third logic state occurs using computer-readable instructions provided to the client machine in response to the query.

* * * * *